(12) United States Patent
Akashi

(10) Patent No.: US 10,632,793 B2
(45) Date of Patent: Apr. 28, 2020

(54) TIRE

(71) Applicant: BRIDGESTONE CORPORATION, Chuo-ku, Tokyo (JP)

(72) Inventor: Tokumasa Akashi, Copley, OH (US)

(73) Assignee: BRIDGESTONE CORPORATION, Chuo-ku, Tokyo (JP)

(*) Notice: Subject to any disclaimer, the term of this patent is extended or adjusted under 35 U.S.C. 154(b) by 6 days.

(21) Appl. No.: 15/122,249

(22) PCT Filed: Mar. 13, 2015

(86) PCT No.: PCT/JP2015/001411
§ 371 (c)(1),
(2) Date: Aug. 29, 2016

(87) PCT Pub. No.: WO2015/151421
PCT Pub. Date: Oct. 8, 2015

(65) Prior Publication Data
US 2017/0008347 A1 Jan. 12, 2017

(30) Foreign Application Priority Data

Apr. 4, 2014 (JP) .................................. 2014-077963

(51) Int. Cl.
*B60C 11/03* (2006.01)
*B60C 19/00* (2006.01)
(Continued)

(52) U.S. Cl.
CPC ........ *B60C 11/032* (2013.01); *B60C 11/0302* (2013.01); *B60C 11/0304* (2013.01);
(Continued)

(58) Field of Classification Search
CPC ... B60C 11/032; B60C 11/0327; B60C 11/04; B60C 11/1236; B60C 2011/0353; B60C 19/002
See application file for complete search history.

(56) References Cited

U.S. PATENT DOCUMENTS 5,924,464 A 7/1999 White
2009/0272474 A1* 11/2009 Nagai ................. B60C 11/0318
152/209.18

FOREIGN PATENT DOCUMENTS

CN 102448742 A 5/2012
EP 1964691 A1 9/2008
(Continued)

OTHER PUBLICATIONS

Machine translation of JP2010-260413 (no date).*

*Primary Examiner* — Steven D Maki
*Assistant Examiner* — Philip N Schwartz
(74) *Attorney, Agent, or Firm* — Kenja IP Law PC

(57) ABSTRACT

A tire (10) includes, in a tread surface (11): at least two circumferential grooves (12, 13) extending in a tire circumferential direction; and a land portion (14) sandwiched between the circumferential grooves (12, 13). The land portion (14) has a resonator (15) including: an air chamber (16); a first branch groove (17); and a second branch groove (18). The two circumferential grooves consist of: a first circumferential groove (12) having a smaller cross-sectional area in a cross section along a plane perpendicular to extending direction of the circumferential grooves; and a second circumferential groove (13) having a larger cross-sectional area in a cross section along a plane perpendicular to extending direction of the circumferential grooves. A centroid (C) of the air chamber (16) is situated to a side (Continued)

closer to the first circumferential groove (12) with respect to a tire widthwise center (CL) of the land portion (14).

6 Claims, 2 Drawing Sheets

(51) Int. Cl.
    *B60C 11/04*     (2006.01)
    *B60C 11/12*     (2006.01)

(52) U.S. Cl.
    CPC .......... *B60C 11/0306* (2013.01); *B60C 11/04* (2013.01); *B60C 19/002* (2013.01); *B60C 11/0327* (2013.01); *B60C 11/1236* (2013.01); *B60C 2011/0353* (2013.01); *B60C 2011/0355* (2013.01); *B60C 2011/0381* (2013.01); *B60C 2011/0388* (2013.01); *B60C 2011/1209* (2013.01)

(56) References Cited

FOREIGN PATENT DOCUMENTS

| | | | | |
|---|---|---|---|---|
| EP | 2011671 | A1 | 1/2009 | |
| JP | H05338411 | A | 12/1993 | |
| JP | 3563534 | B2 | 9/2004 | |
| JP | 2007169144 | A | 7/2007 | |
| JP | 2007237816 | A | 9/2007 | |
| JP | 2007269144 | A | 10/2007 | |
| JP | 2009006831 | A | 1/2009 | |
| JP | 2009083818 | A | 4/2009 | |
| JP | 2009137412 | A | 6/2009 | |
| JP | 2010260403 | A | 11/2010 | |
| JP | 2010260413 | A * | 11/2010 | ............ B60C 11/04 |
| JP | 5013731 | B2 | 8/2012 | |
| JP | 5103069 | B2 | 12/2012 | |
| JP | 5134901 | B2 | 1/2013 | |
| JP | 5350874 | B2 | 11/2013 | |
| JP | 2013233822 | A | 11/2013 | |
| WO | 2007114430 | A1 | 10/2007 | |

* cited by examiner

TIRE

CROSS REFERENCE TO RELATED APPLICATION

This application claims priority to Japanese Patent Application No. 2014-077963 filed on Apr. 4, 2014 in Japan, the entire disclosure of which is incorporated herein by reference.

TECHNICAL FIELD

The disclosure relates to a tire.

BACKGROUND

With quieter vehicles in recent years, the contribution of the load rolling of tires to vehicle noise has increased, and the reduction of such noise has been desired. In particular, high-frequency tire noise of especially around 1000 Hz has been a major cause of vehicle exterior noise, and noise reduction measures have also been needed to address environmental problems.

Tire noise of around 1000 Hz mainly results from air column resonance sound. Air column resonance sound is noise generated by the resonance of air in a tube that is defined by each circumferential groove continuously extending in the circumferential direction of the tread surface and the road surface. Air column resonance sound usually measures about 800 Hz to 1200 Hz in typical passenger vehicles, and occupies a large part of noise generated from tires due to its high peak sound pressure level and wide frequency range.

The human ear is particularly sensitive to a frequency range around 1000 Hz (A-weighting). Hence, reducing air column resonance sound is also effective in improving quietness felt during running.

To reduce air column resonance sound, the following technique has been proposed: a Helmholtz-type resonator having: an air chamber; and a branch groove communicating between the air chamber and a circumferential groove is formed in a land portion, to reduce air column resonance sound using antiresonance (see Patent Literature (PTL) 1).

CITATION LIST

Patent Literature

PTL 1: WO 2007/114430 A1

SUMMARY

Technical Problem

The placement of the Helmholtz-type resonator, etc. can affect the balance of rigidity of the land portion, and may have a negative effect of causing uneven wear in the land portion depending on circumstances.

It could therefore be helpful to provide a tire that can suppress uneven wear in a land portion while effectively reducing air column resonance sound generated from circumferential grooves.

Solution to Problem

A tire according to the disclosure includes, in a tread surface:
at least two circumferential grooves extending in a tire circumferential direction; and
a land portion sandwiched between the two circumferential grooves,
wherein the land portion has a resonator, the resonator including: an air chamber; and a first branch groove and a second branch groove connecting the air chamber with the respective two circumferential grooves,
the two circumferential grooves consist of: a first circumferential groove having a smaller cross-sectional area in a cross section along a plane perpendicular to an extending direction of the circumferential grooves; and a second circumferential groove having a larger cross-sectional area in a cross section along a plane perpendicular to the extending direction of the circumferential grooves, and
a centroid of the air chamber is situated to a side closer to the first circumferential groove with respect to a tire widthwise center of the land portion.

Advantageous Effect

It is thus possible to provide a tire that can suppress uneven wear in a land portion while effectively reducing air column resonance sound generated from circumferential grooves.

BRIEF DESCRIPTION OF THE DRAWINGS

In the accompanying drawings.

DETAILED DESCRIPTION

The following describes disclosed embodiments with reference to drawings.

Figure 1A:
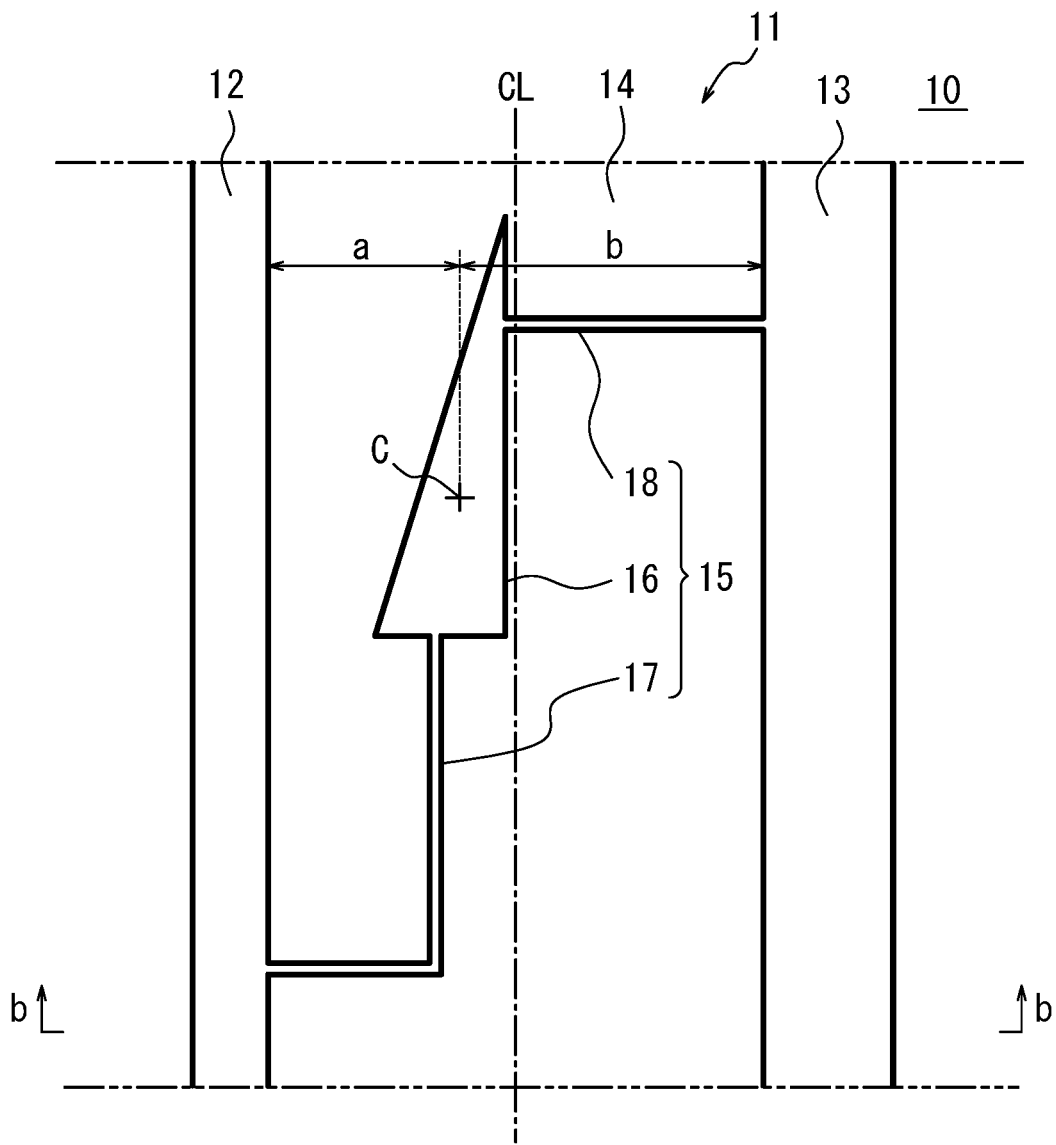
FIG. 1A is an enlarged developed view of part of a tread portion of a tire according to one of the disclosed embodiments.

A tire according to one of the disclosed embodiments is described first. FIG. 1A is an enlarged developed view of part of a tread portion of the tire according to this embodiment.

As illustrated in FIG. 1A, a tire 10 in this embodiment includes, in a tread surface 11: at least two circumferential grooves 12 and 13 continuously extending in the tire circumferential direction; and a land portion 14 defined by being sandwiched between the two circumferential grooves 12 and 13. The tire 10 also includes a resonator 15 formed in the land portion 14. The circumferential grooves are not limited to linear grooves parallel to the circumferential direction as in this embodiment, and may be zigzag grooves or the like.

Figure 1B:
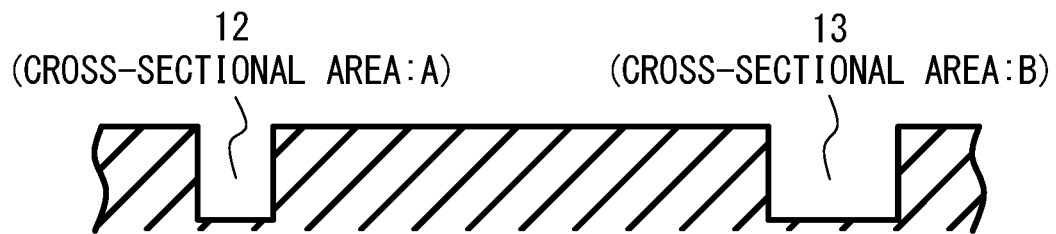
FIG. 1B is a sectional view in the tire width direction taken along line b-b in FIG. 1A.
Figure 2A:
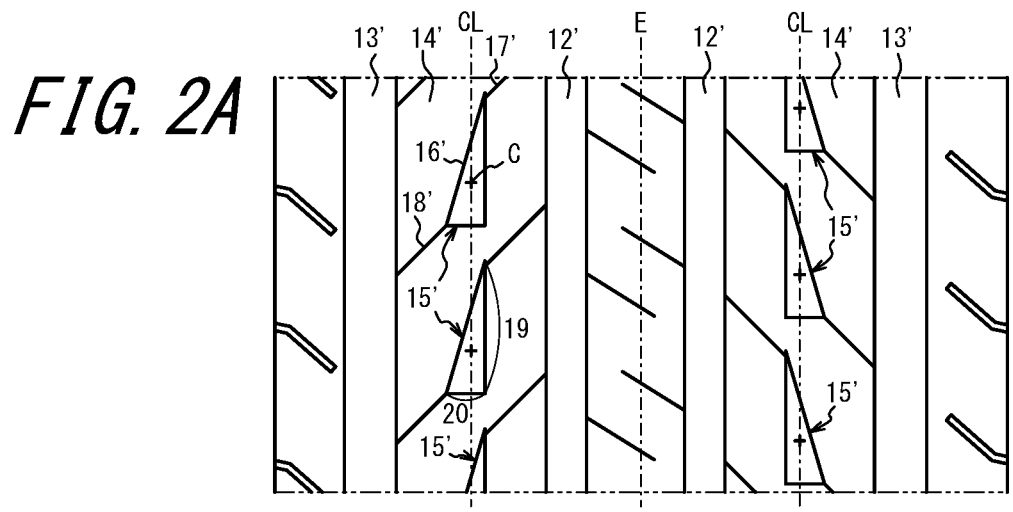
FIG. 2A is a developed view of part of a tread portion of a tire of Comparative Example 1.
Figure 2B:
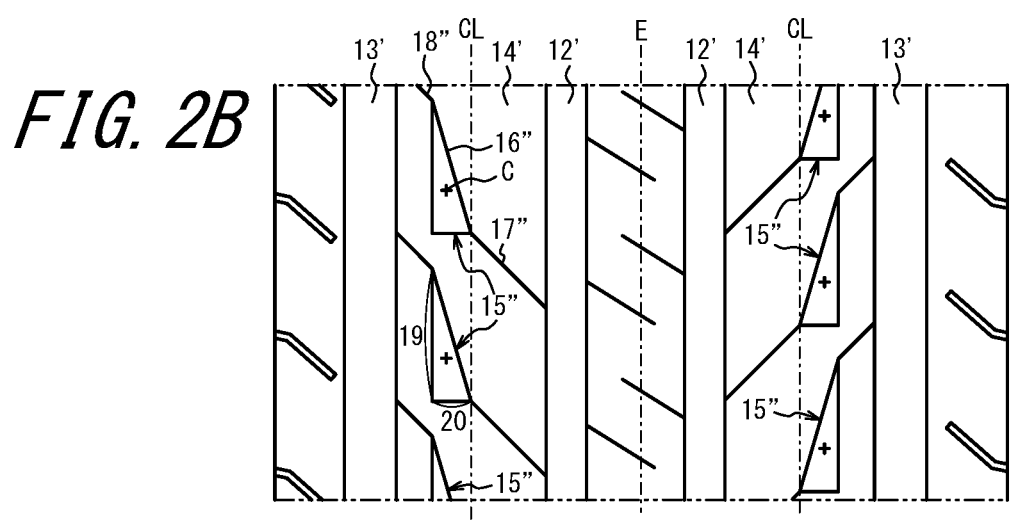
FIG. 2B is a developed view of part of a tread portion of a tire of Comparative Example 2.
Figure 2C:
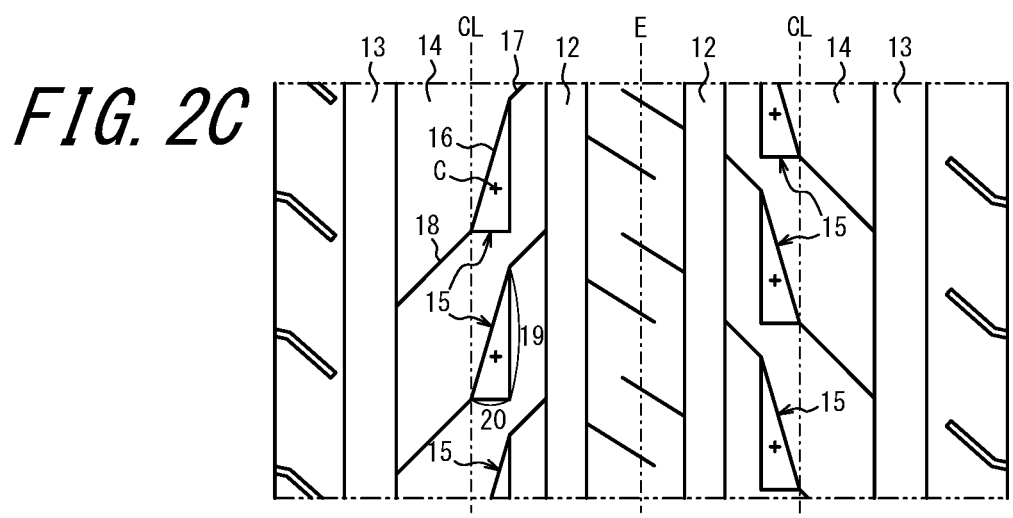
FIG. 2C is a developed view of part of a tread portion of a tire of Example.

As illustrated in FIG. 1B, the two circumferential grooves 12 and 13 are made up of: a first circumferential groove 12 (cross-sectional area A) having a smaller cross-sectional area in a cross section along a plane perpendicular to the extending direction of the circumferential grooves, i.e. a tire widthwise cross section in this embodiment; and a second circumferential groove 13 (cross-sectional area B) having a larger cross-sectional area in a cross section along a plane perpendicular to the extending direction of the circumferential grooves, i.e. a tire widthwise cross section in this embodiment. Although the difference in cross-sectional area between the first circumferential groove 12 and the second circumferential groove 13 derives only from the difference in length in the tire width direction in FIG. 1B, the difference in cross-sectional area may derive only from the difference in depth in the tire radial direction or derive from the difference in length in the tire width direction and the difference in depth in the tire radial direction.

The land portion 14 includes the resonator 15. The resonator 15 includes: an air chamber 16; a first branch groove 17 connecting the air chamber 16 with the first circumferential groove 12; and a second branch groove 18 connecting the air chamber 16 with the second circumferential groove 13.

In this embodiment, the centroid C of the air chamber 16 is situated to the side closer to the first circumferential groove 12 having a smaller cross-sectional area with respect to the tire widthwise center CL of the land portion 14. In detail, the distance a from the centroid C of the air chamber 16 to the end of the land portion 14 on the first circumferential groove 12 side is smaller than the distance b from the centroid C of the air chamber 16 to the end of the land portion 14 on the second circumferential groove 13 side in FIG. 1A. The centroid C of the air chamber 16 mentioned here is the centroid of a homogeneous medium when the air chamber 16 is filled with the medium. Since the depth of the air chamber 16 in the tire radial direction is constant in this embodiment, the position of the centroid C of the air chamber 16 in the developed view in FIG. 1A coincides with the position of the geometric centroid of the triangle formed by the air chamber 16.

This structure reduces air column resonance sound by the resonator 15. Moreover, since the air chamber 16 communicates with both the first circumferential groove 12 and the second circumferential groove 13, this structure achieves the same air column resonance sound reduction effect with fewer resonators 15 than the structure in which air chambers communicating with only the respective circumferential grooves are formed.

Furthermore, this structure suppresses uneven wear in the land portion 14 as described below.

A preferable width and depth of a circumferential groove are determined depending on the location of the circumferential groove. Accordingly, a typical tire may have a plurality of circumferential grooves that differ in cross-sectional area in a cross section along a plane perpendicular to the extending direction of the circumferential grooves. The difference in cross-sectional area between two circumferential grooves defining a land portion affects the balance of rigidity of the land portion. If the balance of rigidity of the land portion is lost, the land portion may become low in rigidity in some part. Such locally low rigidity tends to cause uneven wear in the part.

Besides, the air chamber communicating with the two circumferential grooves that differ in cross-sectional area in a cross section along a plane perpendicular to the extending direction of the circumferential grooves as mentioned above tends to have a relatively large opening area in the tread surface. When the area of the air chamber is larger, the balance of rigidity of the land portion is more affected, which facilitates uneven wear.

Hence, in this embodiment, the centroid C of the air chamber 16 is situated as mentioned above. The balance of rigidity of the land portion 14 in the tire width direction is thus maintained to suppress uneven wear at one end of the land portion 14 in the tire width direction. In more detail, in the case where the centroid of the air chamber is situated at the tire widthwise center of the land portion, the rigidity of the land portion on the side closer to the circumferential groove having a larger cross-sectional area is relatively low. In the case where the centroid C of the air chamber 16 is situated to the side closer to the circumferential groove 12 having a smaller cross-sectional area, on the other hand, the land portion 14 has uniform rigidity, so that uneven wear is suppressed. In addition, since the balance of rigidity in the tire width direction is maintained, steering stability is ensured.

Moreover, in this embodiment, the length the first branch groove 17 communicating with the circumferential groove 12 having a smaller cross-sectional area is longer than the length of the second branch groove 18 communicating with the circumferential groove 13 having a larger cross-sectional area. For example, the first branch groove 17 can be made longer than the second branch groove 18 by forming the first branch groove 17 to extend from the air chamber 16 in the tire circumferential direction and then extend toward the first circumferential groove 12 and forming the second branch groove 18 to extend from the air chamber 16 linearly in parallel with the tire width direction, as illustrated in FIG. 1A.

This structure further maintains the balance of rigidity of the land portion 14 in the tire width direction, and thus further suppresses uneven wear in the land portion 14.

Moreover, in this embodiment, the cross-sectional area of the air chamber 16 in a tire circumferential cross section gradually decreases in the tire width direction toward the first circumferential groove 12. For example, the gradually decreasing cross-sectional area may be realized by at least one of gradually decreasing the depth of the air chamber 16 in the tire radial direction and gradually decreasing the width of the air chamber 16 in the tire circumferential direction. In the example illustrated in FIG. 1A, only the width of the air chamber 16 in the tire circumferential direction gradually decreases as the depth of the air chamber 16 in the tire radial direction is constant.

This structure further suppresses uneven wear in the land portion 14 as described below. If the cross-sectional area of the air chamber 16 in a tire circumferential cross section near the circumferential groove 12 to which the centroid C of the air chamber 16 is closer in the tire width direction is relatively large, there is a possibility that the rigidity between the circumferential groove 12 and the air chamber 16 is insufficient. When the rigidity between the circumferential groove 12 and the air chamber 16 is insufficient, the land portion 14 collapses and the footprint area decreases during cornering, which can cause lower steering stability. In view of this, the air chamber 16 having the aforementioned shape is provided in this embodiment, to ensure the rigidity between the circumferential groove and the air chamber and maintain steering stability during cornering.

Moreover, in this embodiment, the first circumferential groove 12, i.e. the circumferential groove having a smaller cross-sectional area in a tire widthwise cross section, is located inward from the second circumferential groove 13 in the tire width direction, that is, located more centrally than the second circumferential groove 13 in the tire width direction.

The outer part of the land portion 14 in the tire width direction needs to have a sufficient footprint area during cornering. To meet this need, the first circumferential groove 12 is located inward in the tire width direction. With the aforementioned arrangement of the air chamber 16, the second circumferential groove 13 adjacent to the part of the land portion 14 that can come into contact with the ground in a wider area is situated outward in the tire width direction. This ensures a sufficient footprint area during cornering, thus ensuring steering stability during cornering. In addition, since the part of the land portion 14 near the second circumferential groove 13 has a high ground contact pressure, a high steering stability improvement effect is achieved by increasing the footprint area.

Moreover, in this embodiment, preferably the ratio b/a of the distance b from the centroid C of the air chamber 16 to the end of the land portion 14 on the second circumferential groove 13 side to the distance a from the centroid C to the end of the land portion 14 on the first circumferential groove 12 side in the tire width direction substantially matches the ratio B/A of the cross-sectional area B of the second circumferential groove 13 in a tire widthwise cross section to the cross-sectional area A of the first circumferential groove 12 in a tire widthwise cross section.

This structure further maintains the balance of rigidity of the land portion 14 in the tire width direction, and thus further suppresses uneven wear in the land portion 14.

Although the first branch groove 17 is longer than the second branch groove 18 to further suppress uneven wear in the foregoing embodiment, the first branch groove 17 may be smaller in volume than the second branch groove 18 to reduce air column resonance sound more effectively by at least one of: making the first branch groove 17 shorter than the second branch groove 18; and making the cross-sectional area of the first branch groove 17 in a cross section perpendicular to the longitudinal direction smaller than the cross-sectional area of the second branch groove 18 in a cross section perpendicular to the longitudinal direction. The volume of each of the first branch groove 17 and the second branch groove 18 mentioned here is the volume of the space defined by the footprint and the groove wall and groove bottom of the branch groove 17 or 18.

The sound pressure of air column resonance sound varies depending on the cross-sectional area of the circumferential groove in a tire widthwise cross section. With the aforementioned modification in which the volume of the first branch groove 17 communicating with the first circumferential groove 12 smaller in tire widthwise cross-sectional area than the second circumferential groove 13 is smaller than the volume of the second branch groove 18, air column resonance sound generated in each of the first circumferential groove 12 and the second circumferential groove 13 can be reduced effectively.

REFERENCE SIGNS LIST 10 tire
11 tread surface
12 first circumferential groove
13 second circumferential groove
14 land portion
15 resonator
16 air chamber
17 first branch groove
18 second branch groove
19 first side
20 second side
C centroid
CL tire widthwise center of land portion
E tire equatorial plane

The invention claimed is:

1. A tire comprising, in a tread surface:
at least two circumferential grooves extending in a tire circumferential direction; and
a land portion sandwiched between first and second circumferential grooves of the at least two circumferential grooves,
wherein the land portion has a Helmholtz-type resonator, the resonator including: an air chamber; and a first branch groove and a second branch groove connecting the air chamber with the first and second circumferential grooves, respectively,
the first circumferential groove has a cross-sectional area smaller than a cross-sectional area of the second circumferential groove in a cross section along a plane perpendicular to the extending direction of the circumferential grooves, and
a centroid of the air chamber is situated to a side closer to the first circumferential groove with respect to a tire widthwise center of the land portion,
wherein a length of the first branch groove is longer than a length the second branch groove.

2. The tire according to claim 1,
wherein a cross-sectional area of the air chamber in a tire circumferential cross section gradually decreases in a tire width direction toward the first circumferential groove.

3. A tire comprising, in a tread surface:
at least two circumferential grooves extending in a tire circumferential direction; and
a land portion sandwiched between first and second circumferential grooves of the at least two circumferential grooves,
wherein the land portion has a Helmholtz-type resonator, the resonator including: an air chamber; and a first branch groove and a second branch groove connecting the air chamber with the first and second circumferential grooves, respectively,
the first circumferential groove has a cross-sectional area smaller than a cross-sectional area of the second circumferential groove in a cross section along a plane perpendicular to the extending direction of the circumferential grooves, and
a centroid of the air chamber is situated to a side closer to the first circumferential groove with respect to a tire widthwise center of the land portion,
wherein the first circumferential groove is located more centrally than the second circumferential groove in the tire width direction.

4. The tire according to claim 3,
wherein a cross-sectional area of the air chamber in a tire circumferential cross section gradually decreases in a tire width direction toward the first circumferential groove.

5. A tire comprising, in a tread surface:
at least two circumferential grooves extending in a tire circumferential direction; and
a land portion sandwiched between first and second circumferential grooves of the at least two circumferential grooves,
wherein the land portion has a Helmholtz-type resonator, the resonator including: an air chamber; and a first branch groove and a second branch groove connecting the air chamber with the first and second circumferential grooves, respectively, the first circumferential groove has a cross-sectional area smaller than a cross-sectional area of the second circumferential groove in a cross section along a plane perpendicular to the extending direction of the circumferential grooves, and a centroid of the air chamber is situated to a side closer to the first circumferential groove with respect to a tire widthwise center of the land portion, wherein a ratio of a distance from the centroid of the air chamber to an end of the land portion on the second circumferential groove side to a distance from the centroid to an end of the land portion on the first circumferential groove side in the tire width direction matches a ratio of the cross-sectional area of the second circumferential groove in a tire widthwise cross section to the cross-sectional area of the first circumferential groove in a tire widthwise cross section.

6. The tire according to claim 5, wherein a cross-sectional area of the air chamber in a tire circumferential cross section gradually decreases in a tire width direction toward the first circumferential groove.

* * * * *